J. J. CHAMPION AND T. B. MARTINDALE.
APPARATUS FOR REBORING AND REAMING CYLINDERS OF ENGINES.
APPLICATION FILED NOV. 28, 1919.
1,343,517.
Patented June 15, 1920.
3 SHEETS—SHEET 2.
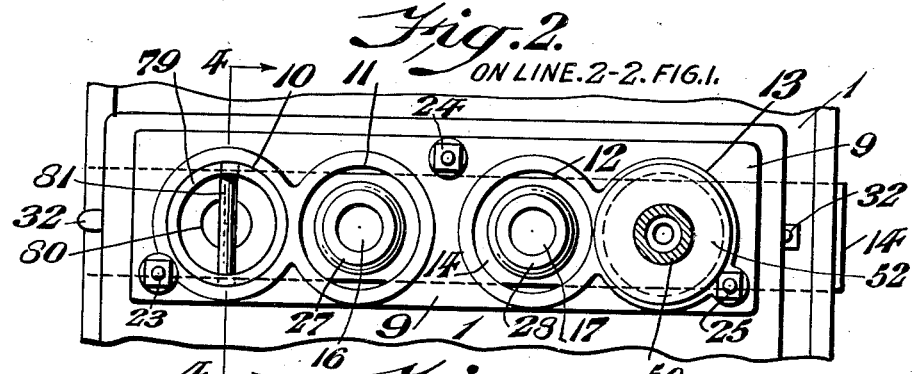
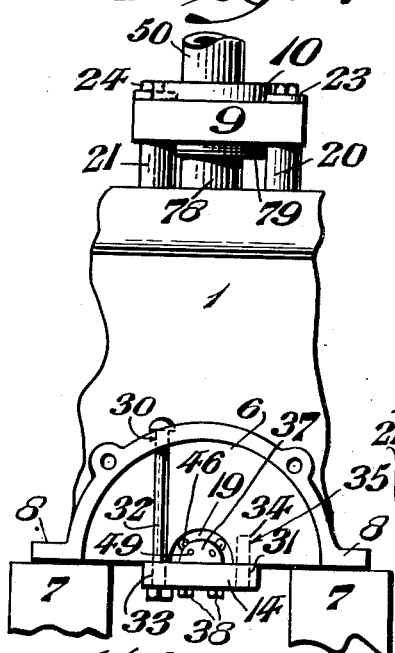
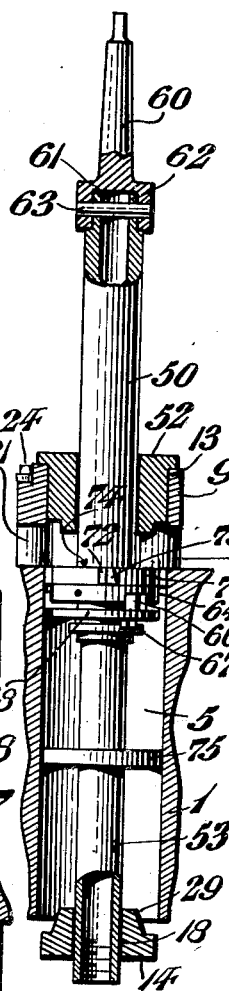
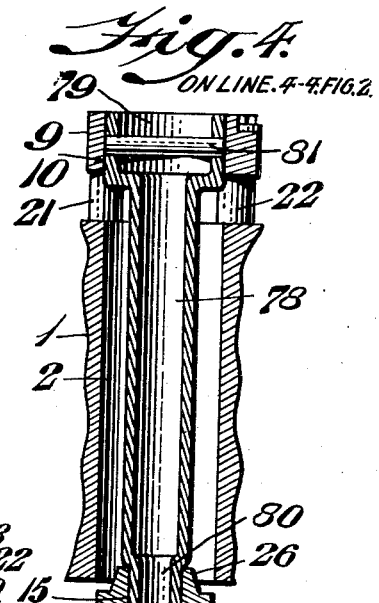
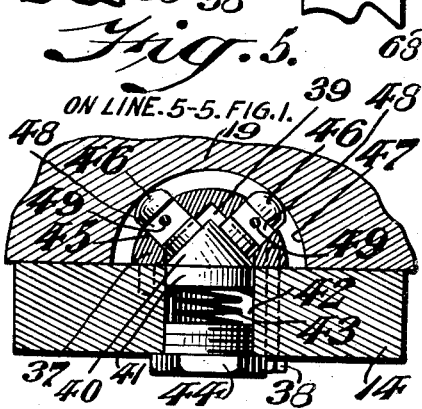
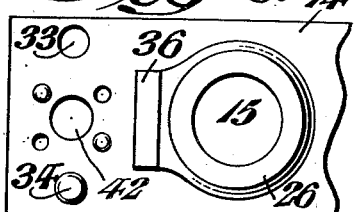
INVENTORS:
Thomas B. Martindale
John J. Champion
BY Wiedersheim & Fairbanks
ATTORNEYS.

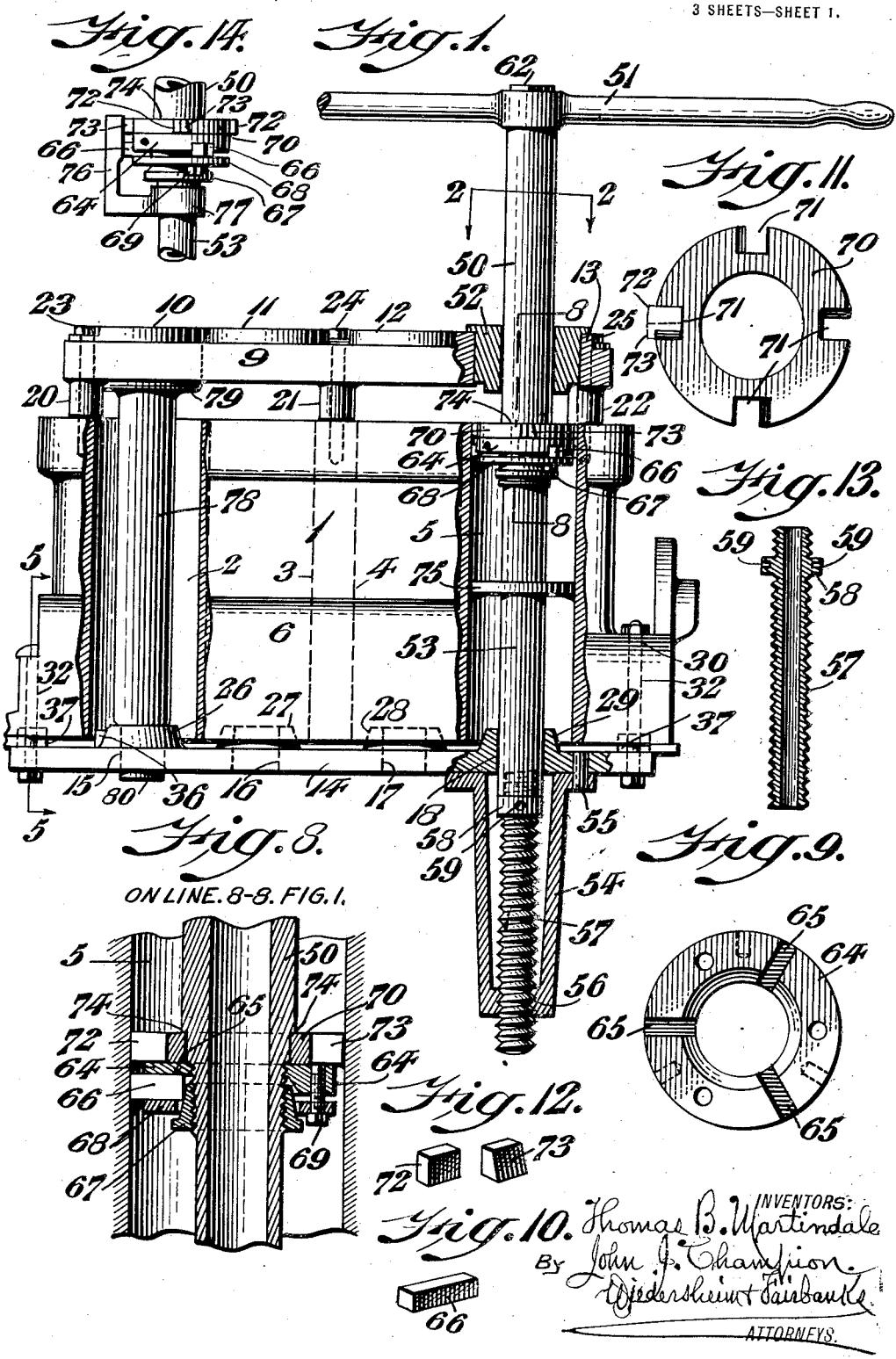

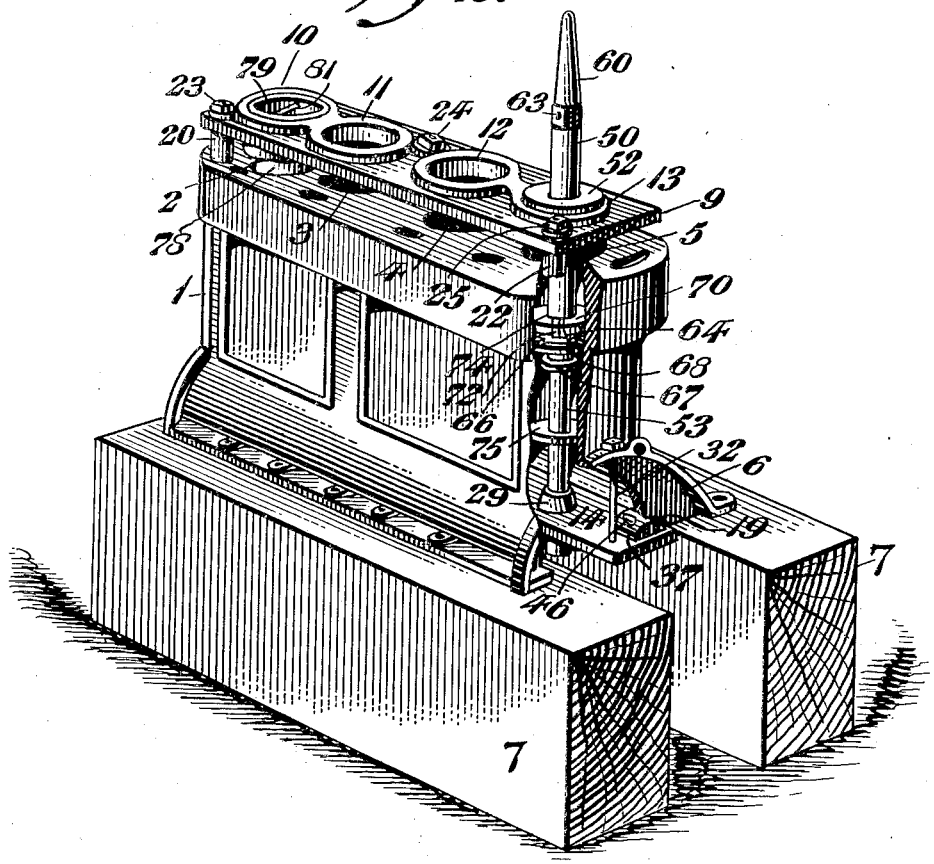

UNITED STATES PATENT OFFICE.

JOHN J. CHAMPION AND THOMAS B. MARTINDALE, OF PHILADELPHIA, PENNSYLVANIA, ASSIGNORS TO CHAMPION MANUFACTURING CO., OF PHILADELPHIA, PENNSYLVANIA, A CORPORATION OF PENNSYLVANIA.

APPARATUS FOR REBORING AND REAMING CYLINDERS OF ENGINES.

1,343,517.   Specification of Letters Patent.   Patented June 15, 1920.

Application filed November 28, 1919. Serial No. 341,256.

*To all whom it may concern:*

Be it known that we, JOHN J. CHAMPION and THOMAS B. MARTINDALE, both citizens of the United States, residing in the city and county of Philadelphia and State of Pennsylvania, have invented a new and useful Apparatus for Reboring and Reaming the Cylinders of Engines, of which the following is a specification.

Our invention relates to the class of devices which are employed to rebore and ream or refinish the cylinders of engines, particularly of the internal combustion type, and more especially those in which the housing of the crank axle and cranks is integral with the housing of the cylinders and bears such definite relation to said housing that very great accuracy of placing or disposition of the cylinder housing with reference to the boring tool is necessary.

The primary object of our invention is the organization of such an apparatus as can be employed in connection with the cylinders of engines having detachable heads after the detachable heads have been removed and after the basal inclosure of the crank axle housing and the basal segments of the crank shaft bearings have also been removed, and the composite housing which contains both the cylinders and the upper members of the crank axle housing and crank shaft bearings has been mounted upon any preferred type of supporting base to make it possible to apply and operate the devices hereinafter described which serve to rebore and ream the cylinders smooth, straight, true in radius, at proper center distances from, squared with regard to, and perfectly alined with, the bearings of the crank shaft, with but a single setting of the locating plates.

Further objects are a novel and useful formation of the locating plates,—of which, except where V-shaped engines are under treatment, but two, an upper plate and a lower plate, are used;—the general design of said locating plates;—the peculiar construction of boring tools which we prefer to employ;—and the general assemblage and configuration of the various elements which make accurate placement of the parts, and consequent accurate reboring of the cylinders, certain,—it being provided that but one location of the plates is sufficient to insure the accuracy of the application and operation of the boring tool with respect to such plurality of cylinders as are embodied in the housing under treatment.

With the foregoing and other objects in view, our invention comprehends a special and novel construction of a top and a bottom locating plate;—a special and novel alinement of numerically corresponding locating holes in said plates;—special adjusting devices for insuring the correct mounting of both the top locating plate and the bottom locating plate relatively to the housing as an entirety to which they are applied;—a special and novel means for adjustment of the bottom locating plate with relation to the crank shaft bearings;—a special and novel construction of a boring tool which preferably effects at a single operation both the rough cutting or reboring, and the reaming or finishing of the cylinders;—novel constructions of the boring and reaming devices themselves, to cause the cutting tool as such to embody them and operate them as a unit, so to speak;—and means for adjusting the cutting mechanism, broadly as such, to be operated either by hand or by machine.

Our invention further comprehends special details of construction which are represented in the accompanying drawings and hereinafter described, the particular subject-matter which we claim as novel being definitely set forth in the claims.

For the purpose of illustrating our invention, we have in the accompanying drawings shown a certain type and embodiment of it which is at present preferred by us because in practice it will be found to give satisfactory and reliable results.

It is to be understood, however, that the various instrumentalities in which our invention is shown as embodied can be variously arranged and organized and that our invention is not, therefore, limited to the precise arrangement and organization of the instrumentalities which are typified in the construction shown in the accompany-drawings and hereinafter described.

In the drawings:—

Figure 1 represents a side elevation, partly sectional, of the cylinder and crank shaft housing of a 4-cylinder internal combustion engine,—with the cylinder head and the basal member of the crank shaft housing detached, the view illustrating a hand-operated boring and reaming mechanism.

Fig. 2 represents a top plan view of the top locating plate and a portion of the housing represented in Fig. 1, the cutting shaft or cutter bar being sectional on the dotted line 1—1 of Fig. 1.

Fig. 3 represents an end elevation of the embodiment of our invention illustrated in Figs. 1 and 2, viewed from the left-hand end of each of said figures.

Fig. 4 represents a central, vertical, sectional elevation through one of the cylinders, through the top locating plate and the bottom locating plate, and through a locater for centering certain locating holes of both the top and the bottom locating plates,— the section being taken on the dotted line 4—4 of Fig. 2.

Fig. 5 represents a fragmentary, sectional end elevational view on the line 5—5 of Fig. 1, through the adjusting device which serves directly to center the upper segment of a crank shaft bearing.

Fig. 6 represents a fragmentary left-hand-end plan view of the bottom locating plate, illustrating a rear end cylinder and a centering lug.

Fig. 7 represents a central, vertical, side elevation, partly sectional, of our cutting devices equipped to be machine-operated instead of hand-operated as in the mounting of Fig. 1.

Fig. 8 represents a central, sectional elevation on the line 8—8 of Fig. 1, through a preferred form of boring and reaming mechanism applied so as to become a part of the cutting tool.

Fig. 9 represents a bottom plan view of the lower or boring cutter head removed from the cutter bar.

Fig. 10 represents a perspective view of one of the cutting blades for said lower cutter head.

Fig. 11 represents a bottom plan view of the upper or reaming cutter head removed from the cutter bar.

Fig. 12 represents a perspective view of a reamer blade and a reamer blade wedge, removed from said upper cutter head.

Fig. 13 represents a central, vertical, sectional elevation through a cutter bar screw detached from the cutter bar.

Fig. 14 represents a side elevation of both the rough cutters for doing the boring and of the reaming blades for doing the finishing, with an attaching gage to adjust the set of the boring cutters.

Fig. 15 represents a partially fragmentary perspective view of an engine housing mounted upon a horizontally disposed supporting bed, illustrating the application to it of our top and bottom locating plates and of a boring mechanism adapted to be operated by machine power.

Similar numerals of reference indicate corresponding parts.

*The housings and locating plates.*

Referring to the drawings:—

1 designates a 4-cylinder housing, the cylinders of which to be rebored, are designated 2, 3, 4 and 5,—while 6 designates the upper segment or member of the crank shaft housing. From the cylinder housing the head has been detached, and from the upper segment of the crank shaft housing the lower segment has been removed.

In the practice of our invention, the housing as an entirety, after the removal of the foregoing elements, is mounted or superposed, and, if desired, positively connected with supporting bed blocks 7, as shown in Fig. 15. These bed blocks, however, are typical merely of a foundation or other preferred means for the supporting of our housing during the operation of the reboring and reaming of its cylinders, and any form of foundation may be employed provided that supporting surfaces for the connective flanges 8 of the crank housing are provided and so far separated from each other as to afford a clear exposure or clearance of the under surface of the housing as an entirety for the purpose of making it possible to apply and secure the bottom locating plate and to do the several things hereinafter explained.

9 designates a top locating plate, which in the organization shown is formed with four locating holes 10, 11, 12 and 13 at corresponding center distances from, that is to say in central axial alinement with corresponding locating holes 15, 16, 17, 18, in a bottom locating plate 14.

In a general way, the top and the bottom locating plates are correspondent in outline and they are respectively adapted to be so applied relatively to the axial centers of the cylinders to be bored, that when they have been secured, the top locating plate to the upper surface of the cylinder housing and the bottom locating plate to the under surface of the crank shaft bearings 19 of the crank shaft, imaginary axes extending centrally through the respective locating holes 10, 11, 12 and 13 of the top locating plate 9 and the respective corresponding locating holes 15, 16, 17, 18 of the bottom locating plate 14, will be geometrically coincident with the axes of the cylinders.

The first mounting of the locating plates in their proper positions relatively to the housing, is secured by means of both the cutting tool itself and a locater, respectively introduced into the two end cylinders as shown in Fig. 1, and hereinafter described.

It being understood that in a 4-cylinder housing, such, for instance, as that of the engine of a typical Ford automobile, there are certain definitely located bolt holes on the upper surface of the cylinder housing, into which the standard cylinder head bolts are ordinarily applied in the securing of the detachable head to the cylinder housing,—and also that in the upper segment of the crank shaft housing there are other bolt holes to permit of the securing of the lower segment of said crank shaft housing by the similar use of standard securing bolts,—it is to be explained that after the insertion of the locater and of the cutting tool as hereinafter explained, we use these bolt holes to secure the accurate retention by bolts and nuts of both our top locating plate and our bottom locating plate.

We preferably form the under surface of the top locating plate 9 with a plurality of preferably three depending axially bored lugs 20, 21 and 22, the bores of which are respectively alined with regularly placed bolt holes upon the upper surface of the cylinder housing, and fasten the plate to the housing by securing bolts 23, 24, 25, as best shown in Figs. 1, 2 and 3.

After the bottom locating plate 14 has been first applied and secured, it will be obvious that its locating holes 15, 16, 17 and 18 will after the insertion of the locater and boring tool, be centered respectively with the locating holes 10, 11, 12 and 13 of the top locating plate 9,—and that therefore, when the boring tool hereinafter described is operated, it will be axially central of the upper and lower holes through which it is inserted, and will of necessity bore the cylinder correctly even though said cylinder be not in true axial alinement with the axis of the boring tool.

The bottom locating plate 14, best seen in Fig. 1, is as to its upper surface preferably provided with a plurality of upwardly extending bosses 26, 27, 28 and 29, through which the locating holes 15, 16, 17 and 18 are bored, and when said bottom locating plate has been secured to the crank shaft bearings 19, and their housing, its locating holes 15, 16, 17 and 18, will be in alinement, respectively, with the locating holes 10, 11, 12 and 13 of the top locating plate 9.

Inasmuch as in order to secure to it its lower segment or inclosure, there are ordinarily formed at the ends of the upper member of the crank shaft housing 6, apertures or bolt holes 30 and 31, as best seen in Fig. 3,—we utilize these holes to secure the accurate placing of the bottom locating plate 14 and to effect the fastening of said plate, by using a bolt 32, which passes through the hole 30 and also through a hole 33 in said bottom plate 14, and also a dowel pin 34 which extends upwardly from the upper surface of said bottom plate 14 and enters in a pin socket 35 formed in the crank housing. This securing means is, of course, duplicated at each end of the bottom plate and crank housing and with as many crank shaft bearings as may be employed.

In order further to secure the exact end-for-end location of the bottom-locating plate relatively to the crank shaft housing, we provide upon the upper surface of said bottom plate, a lug or stop 36, see Fig. 6, placed at the correct distance from the center of the first cylinder to permit of the proper positioning of the casting of said cylinder relatively to the face of the front crank shaft bearing 19. The application of this lug to one end only of the bottom locating plate makes it impossible to set the plate in a reversed or wrong position, except where, as sometimes is the case, the centers of the first and last cylinders are equally distant from the inside faces of the front and rear crank shaft bearings 19.

By the foregoing means of end-for-end centering, the correct placing of the bottom locating plate and its connection with the crank shaft housing and the upper segments of both the front and the rear bearings of the crank shaft are positively and accurately assured.

For the purpose of further assuring the centering of the segments of the crank shaft bearings, we have resorted to certain devices particularly illustrated in Figs. 3 and 5, which being duplicated at each end of the block and with each shaft-bearing will be understood from the following description of one:—

*The means for positioning the bottom locating plate with reference to the crank shaft bearings.*

37 designates a bottom locating block, externally in the form of a section of a semi-cylinder, that is to say, a semi-cylindric segment of desired dimensions, which is conveniently secured by a bolt 38 and dowel pin to the bottom locating plate 14, and which is internally formed with a conical chamber 39, into which enters the upper conical end 40 of a cylindric device which I term a pin push block 41, seated and adapted for vertical movement within a cylindric recess 42 extending vertically through the bottom locating plate 14 and adapted to be constantly forced upward under the stress of a compressed spiral spring 43 within said recess 42, and held in place by a cap screw 44 screwed into said recess from the bottom surface of the bottom locating plate 14.

Extending through the bottom locating block 37, from its exterior cylindric surface, and opening into the conical chamber 39 within it, are two oppositely and rightangularly disposed radial channels 45, which contain hemispherically headed plungers 46, the heads or outer ends of which extend beyond the outer cylindric surface of the block 37, and the lower or inner ends of which, extending into the chamber 39, bear against the conical upper end 40 of the push block 41, so that in the movement of said block vertically upward under the expansion of its spring 43, the plungers are forced radially outward, so as, as best seen in Fig. 5, to bear against the internal semi-cylindric bearing surface 47 of the upper segment of the crank shaft bearing 19.

To effect the retention under all conditions of the plungers within their channels, I form their side faces with retaining slots 48 into which extend the ends of retaining pins 49 the opposite ends of which are fastened in the push block 41.

By reason of the uniform spring-pressure exerted upon these plungers, it will be obvious that they will secure the accurate and transversely correct placement of the bottom locating plate 14 relatively to both of the crank shaft bearings, and that in connection with the accurate securing of said bottom plate to the crank shaft housing, the exact registration of said bottom plate relatively to the top plate will be effected.

It is further obvious that by the employment of the foregoing centering and registering devices, the bottom locating plate will be retained in the desired position with relation to the crank shaft bearings, whether practically unworn or slightly worn.

The means for centering the locating plates relatively to the housing before their bolting fast, comprises, as already explained, both the locater and the boring and reaming mechanism, and is the following:—

The locater.

In Figs. 1 and 4 is represented a device which we term a locater 78, the same being a hollow tubular body expanded at the top to form a head 79 adapted to fit closely within a locating hole in the top locating plate, and at the bottom contracted to form an extension 80 adapted to fit closely within a bottom locating hole in the bottom locating plate, which hole, of course, is one in axial alinement with a corresponding hole in the top locating plate.

81 designates a handle bar extending within the head 79 of the locater, by means of which the latter may be lifted out of or dropped into the position which it is shown as occupying in Figs. 1 and 4.

The function of this locater is, in conjunction with the boring tool, to insure the alinement of the centers of the upper and lower locating holes of the top and bottom locating plates, respectively, with relation to the axis of the boring tool with respect to which said locating holes are employed, and it is introduced within the cylinder opposite that into which the cutting tool is introduced as best shown in Fig. 1.

The boring and reaming mechanism.

The top and bottom locating plates having been applied to the housing as an entirety, and positioned by the locater and boring tool in the manner already described, the assembled elements are in readiness for the operation of the devices which bore and ream the cylinders, and which, as already mentioned, serve also in co-action with the locater to complete the positioning.

These devices, as stated, may be operated manually or by machine power.

Referring first to the manual operation, 50 designates the upper end of the cutter or boring bar, a preferably tubular shaft, to the upper end of which, to effect its rotation, is applied a removable operating handle 51.

This bar with the circular cutters and reamers with which it is provided, is first introduced into the cylinder that is farthest from that in which the locater has been inserted by passing it through the proper locating hole in the top locating plate, staying it and centering it with relation to said hole by means of a bushing 52, Fig. 1, introduced within the hole in question.

Beneath a point approximately midway of its length, the cutter bar is preferably diametrically narrowed so as to form a lower extension 53, which, in the introduction of the device as an entirety, passes through the locating hole in the bottom locating plate which corresponds to the locating hole in the top locating plate through which the upper end of said cutter bar has been passed.

In this operation of the cutting device by hand rotation, a socket 54 is attached by any convenient means, such, for instance, as the fastening screw 55, to the bottom locating plate 14. In the bottom of the socket is a threaded bearing 56, through which passes a cutter bar screw 57, see Fig. 13, which is adapted to be screwed into the internally threaded lower end of the lower extension 53 of the cutter bar, and which is provided with a collar 58 having radial spanner holes 59, see Fig. 1, for a spanner (not shown) to twist the screw 57 into the cutter bar 50—53. It may, of course, be otherwise connected.

When the cutter bar is to be operated by a drill press or other power machine, this socket 54 and screw 57, being unnecessary, are removed, and instead of the handle 51, which is also taken off from the upper end of the cutter bar, a head bar 60, see Fig. 7, is applied to said end in any preferred way, but, conveniently, removably, by forming it with an internally squared depending socket 61, which fits over the squared upper end 62 of the cutter bar and is secured by a locking pin 63, all as clearly shown in Fig. 7.

*The cutters.*

Applied to and carried by the cutting bar in our preferred organization, are two sets of cutters, rough or boring cutters which are below, and finishing or reaming cutters, which are above. Both sets of cutters are particularly illustrated in Figs. 1, 8, 9, 10, 11, 12 and 14, and the rough cutters are preferably composed of the following assemblage:—

A cutter head 64, in the form of an annular disk carries within radial slots 65 a series of radially extending cutters or cutting blades 66, see Figs. 9 and 10, which are adapted to be forced radially outwardly through their slots by an external conical screw-expander 67 threaded upon a threaded portion of the lower extension 53 of the cutter bar.

The lower cutter head 64 and its cutting blades 66, mounted upon the cutter bar 50 are entered within the cylinder, and said cutting blades are secured within their slots by an annular clamp plate 68 secured to the cutter head 64 by clamp plate screws 59, see Fig. 8. It is obvious that the radial adjustment of the cutting blades 66 for the rough cutting or boring of the cylinder is made possible by the adjustment of the screw expander 67.

*The reaming devices.*

Above the boring or rough cutting device above described, and mounted upon the lower cutter head 64, are reaming devices preferably of the following constructions:—

70 designates what we call an upper cutter head, see Fig. 11, which is an annular disk mounted upon the smooth upper end of the lower extension 53 of the cutter bar, and provided with radial peripheral notches 71, within each of which are placed a reamer blade 72 and a reamer-blade-wedge 73, see Fig. 12, which latter in the assemblage of the parts and in the forcing up of the lower cutter head 64 against the upper cutter head 70, operate to retain the reamer blades in position to meet requirements of the internal dimensions of the cylinder to be operated upon, all as will be easily understood.

The limitation of upward movement of both the rough cutting and the reaming devices is effected by a stop shoulder 74 on the upper end 50 of the cutter bar.

A washer 75, of leather or other preferred material serves to catch and retain the cuttings of the blades and prevent them from falling or working down into the locating holes of the bottom locating plate 14.

As a device for effecting the desired setting particularly of the rough or boring cutters 66, we find it convenient to employ a gage 76, see Fig. 14, extending radially outward and then upward from a collar 77, which can be slipped upon the lower extension 53 of the cutter bar.

The function of this gage, the dimensions of which are calculable to suit the requirements of the cutters, is to make possible the accurate adjustment of the rough cutting blade 66 relatively to the adjustment of the reamer blades, so as to define the depth of the internal surfaces of the cylinder which after the rough cutting or boring has been done, are left to be reamed or finished.

The reaming blades are preferably ground in place and held to duty by the upwardly exerted pressure of the lower cutter head against their under faces.

*The operation.*

From the description of the construction and operation of the different elements which my apparatus comprehends, already given, the means of operating the apparatus as an entirety will, as we believe, have been sufficiently understood. Suffice it to add that after the removal of the cylinder head from the cylinder housing and of the basal element of the crank shaft housing and of the basal segments of the crank shaft bearings, the housing as an entirety is placed upon a supporting foundation, either as illustrated for instance, by the bed blocks in Fig. 15, or otherwise as desired, and that, thereafter, by the introduction of the locater and of the cutting devices, the top locating plate will be properly positioned and in readiness to be secured to the uncovered cylinder housing, and the bottom locating plate similarly positioned and in readiness to be secured to the uncovered basal portion of the crank shaft housing and crank shaft bearings,—the ultimate securing, positioning and alinement of the corresponding locating holes of the respective locating plates being effected by the securing bolts.

After the screwing up of the locating plates, and the removal of the locater, the cutting tool as an entirety, being positioned within the proper locating hole in the bottom locating plate, and whether applied so as to be operated manually, or to be mechanically driven, is operated, and, the rough cutters and the reaming blades having all been properly adjusted, the imparted rotation of said cutting device as an entirety, results in the accurate reboring and reaming at a single operation of the cylinder first to be operated upon,—and, thereafter, after the removal of the cutting means from the first cylinder to the other cylinders, preferably in successive order, the reboring and reaming of said other cylinders is similarly and with equal efficiency accomplished.

Although we have described our apparatus as intended for the reboring of old cylinders, it is obvious that it can be used for the boring and finishing of new cylinders.

It will now be apparent that we have devised a new and useful apparatus for boring and reaming engine cylinders which embodies the features of advantage that we have enumerated as within the objects of our invention, and that while we have in the present instance shown and described a preferred embodiment of it which in practice will be found to give satisfactory and reliable results, it is to be understood that the embodiment is susceptible of modification in various particulars without departing from the spirit or scope of the invention or sacrificing any of its advantages.

Having thus described our invention, we claim:—

1. In an apparatus for reboring engine cylinders, means for supporting a cylinder housing to be rebored; means for positioning a reboring mechanism to operate upon said housing, which comprises a top locating plate and a bottom locating plate; means for fixedly securing to said housing said positioning means; and reboring mechanism.

2. In an apparatus for reboring engine cylinders, means for fixedly supporting a cylinder housing to be rebored during the operation of the reboring of its cylinders; means for positioning a reboring mechanism to operate upon the cylinders of said housing, which comprises a top locating plate formed with locating holes numerically corresponding to the cylinders of the housing to be rebored and a bottom locating plate similarly formed with locating holes corresponding numerically to the holes of the top locating plate and to the cylinders to be rebored; means for fixedly securing to said housing said positioning means; and reboring mechanism.

3. In an apparatus for reboring engine cylinders, means for fixedly supporting a cylinder housing to be rebored during the operation of the reboring of its cylinders; a top locating plate formed with locating holes numerically corresponding to the cylinders of the housing to the rebored; a bottom locating plate similarly formed with locating holes numerically corresponding to the cylinders of the housing to be rebored; means for positioning said locating plates relatively to the cylinders of the housing to be rebored, which comprises a locater or locating device and a cutting mechanism which is both a locating means and a cutting mechanism; and means for fixedly securing to the housing both the top and the bottom locating plate with the counterpart holes of said plates in axial alinement with the cylinders to be rebored.

4. In an apparatus for reboring engine cylinders, means for fixedly supporting a cylinder housing to be rebored during the operation of the reboring of its cylinders; a top locating plate formed with locating holes numerically corresponding to the cylinders of the housing to be rebored; a bottom locating plate similarly formed with locating holes numerically corresponding to the cylinders of the housing to be rebored; a locating means for positioning said locating plates with relation to the cylinders of the housing to be rebored; a cutting mechanism which both rebores and finishes the cylinders to be rebored; and means for operating said cutting mechanism.

5. In an apparatus for reboring engine cylinders, means for fixedly supporting a housing during the operation of the reboring of its cylinders; a top locating plate formed with locating holes numerically corresponding to the cylinders of the housing to be rebored; a bottom locating plate similarly formed with locating holes numerically corresponding to the cylinders of the housing to be rebored; a locating means for positioning said locating plates with relation to the cylinders of the housing to be rebored; a cutting mechanism; and means for operating said cutting mechanism.

6. In an apparatus for reboring engine cylinders; a housing embodying cylinders to be rebored and the upper segments of crank shaft bearings; means for fixedly supporting said housing during the operation of the reboring of its cylinders; a top locating plate formed with locating holes numerically corresponding to the cylinders of the housing to be rebored; a bottom locating plate similarly formed with locating holes numerically corresponding to the cylinders of the housing to be rebored and provided with means for positioning it with relation to the upper segments of the crank shaft bearings; a locating means for positioning both of said locating plates with relation to both the cylinders of the housing to be rebored and the upper segments of the crank shaft bearings; a cutting mechanism which both rebores and finishes the cylinders to be rebored; and means for operating said cutting mechanism.

7. In an apparatus for reboring engine cylinders, means for fixedly supporting a housing embodying cylinders to be rebored and also the upper segments of crank shaft bearings during the operation of the reboring of its cylinders; a top locating plate formed with locating holes numerically corresponding to the cylinders of the housing to be rebored; a bottom locating plate similarly formed with locating holes numerically corresponding to the cylinders of the housing to be rebored; a locating means for positioning both of said locating plates with relation to both the cylinders of the housing to be rebored and the upper segments of the crank shaft bearings; a cutting mechanism which both rebores and finishes the cylinders to be rebored; and adjusting means comprising spring-controlled plungers connected with the bottom locating plate for positioning said bottom locating plate with reference to the crank shaft bearings.

8. In an apparatus for reboring engine cylinders, means for fixedly supporting a housing embodying cylinders to be rebored and also the upper segments of crank shaft bearings during the operation of the reboring of its cylinders; a top locating plate formed with locating holes numerically corresponding to the cylinders of the housing to be rebored; a bottom locating plate similarly formed with locating holes numerically corresponding to the cylinders of the housing to be rebored, and provided with means for positioning it endwise with relation to the cylinder housing; a locating means for positioning both of said locating plates with relation to both the cylinders of the housing to be rebored and the upper segments of the crank shaft bearings; a cutting mechanism which both rebores and finishes the cylinders to be rebored; and adjusting means comprising spring-controlled plungers connected with the bottom locating plate for positioning said bottom locating plate with reference to the crank shaft bearings.

In testimony whereof we have hereunto signed our names this twenty-first day of November, 1919.

JOHN J. CHAMPION.
THOS. B. MARTINDALE.

In the presence of—
J. BONSALL TAYLOR,
HARRY COHEN.